(12) United States Patent
Remes

(10) Patent No.: US 6,590,974 B1
(45) Date of Patent: Jul. 8, 2003

(54) HOWLING CONTROLLER

(75) Inventor: Corneliu R. Remes, Kanata (CA)

(73) Assignee: Zarlink Semiconductor Inc., Kanata (CA)

( * ) Notice: Subject to any disclaimer, the term of this patent is extended or adjusted under 35 U.S.C. 154(b) by 0 days.

(21) Appl. No.: 09/163,247

(22) Filed: Sep. 30, 1998

(30) Foreign Application Priority Data

Oct. 24, 1997 (GB) .............................................. 9722381

(51) Int. Cl.[7] .................................................. H04M 1/20
(52) U.S. Cl. ............................ 379/406.07; 379/388.07; 381/93
(58) Field of Search ............................... 381/83, 93, 66; 379/399.01, 406.07

(56) References Cited

U.S. PATENT DOCUMENTS

| 4,449,237 A | | 5/1984 | Stepp et al. ................... 381/93 |
| 5,014,294 A | * | 5/1991 | Kromenaker et al. ........ 455/570 |
| 5,099,472 A | | 3/1992 | Townsend et al. ........... 370/291 |
| 5,307,417 A | | 4/1994 | Takamura et al. ............. 381/83 |
| 5,323,458 A | | 6/1994 | Park et al. ............. 379/406.08 |
| 5,379,450 A | | 1/1995 | Hirasawa et al. ............ 455/570 |
| 5,442,712 A | * | 8/1995 | Kawamura et al. ........... 381/83 |
| 5,631,900 A | | 5/1997 | McCaslin et al. ............ 370/287 |
| 5,668,794 A | | 9/1997 | McCaslin et al. ............ 370/288 |
| 5,852,661 A | * | 12/1998 | Chen ..................... 379/406.07 |
| 6,442,280 B1 | * | 8/2002 | Ito ............................... 381/83 |

FOREIGN PATENT DOCUMENTS

| EP | 0804 011 A2 | 10/1997 |
| GB | 2 261 138 A | 5/1993 |
| GB | 2 318 023 A | 8/1998 |

OTHER PUBLICATIONS

M. van Bokhorst and J. Janssen; "Telephone Hybrid with an Automatic Dual Feedback Canceller"; EBU Review—Technical; Feb./Apr. 1990.
Ryoichi Miyamoto et al; "Hands–free Mobile Telephone Using Echo Canceller LSI"; 1989 IEEE.

* cited by examiner

Primary Examiner—Forester W. Isen
Assistant Examiner—Daniel Swerdlow
(74) Attorney, Agent, or Firm—Marks & Clerk

(57) ABSTRACT

A digital signal processing algorithm to cancel howling in a telephone circuit, the telephone circuit being characterized by a receive path and a transmit path in an effective closed loop configuration. The algorithm monitors input samples taken from the receive path and, if a howling signal is detected, controlled amounts of attenuation are introduced to the loop until howling is cancelled. In a preferred embodiment a prediction logic is included in the algorithm to verify the howling signal.

11 Claims, 8 Drawing Sheets

HOWLING CONTROLLER

FIELD OF THE INVENTION

This invention relates to telephone networks including four-wire circuits forming closed loops which are prone to howling and more particularly to a howling controller, implementing a DSP algorithm, for detecting the presence of howling and canceling the same by introducing an appropriate attenuation to the closed loop.

BACKGROUND OF THE INVENTION

A positive feedback exists in a closed loop (see FIG. 1) when the following relation (Barkhausen) sets up:

$$\beta * G = 1, \qquad (1)$$

where $\beta$=transfer function on the feedback path, in open loop; and

G=transfer function on the direct path, in open loop.
This relation is equivalent to the following simultaneous conditions:

$$|\beta| * |G| = 1 \qquad (2)$$

$$\arg(\beta) + \arg(G) = 2*\pi, \text{ in radians} \qquad (3)$$

Such positive feedback usually appears when the closed loop gain is higher than a certain value. The effects of the positive feedback in the baseband (i.e., 300 Hz–3400 Hz) of the telephone circuits are the well-known phenomena of "singing" and "howling". Both of these drastically impair the useful signals, and should, therefore, be under strict control.

A possible definition of howling is the result of a positive feedback developed on telephone network four-wire circuits as a consequence of an imperfect echo cancellation. Analyzing the above noted relation in (1) or the relations in (2) and (3), two possibilities to cancel the positive feedback can be derived:

a) by introduction of an attenuation on the feedback path; or b) by changing the phase characteristic of the feedback path.

PRIOR ART

Based on the two above mentioned approaches, the following main methods were used previously:
Phase methods: i) All pass filter with variable group delay characteristics;
  ii) Random phase shifting;
  iii) Constant frequency shifting with signal re-sampling; and
  iv). Two, directional microphones method.
Attenuation methods: i) Variable loss circuit.

A howling signal spectrum changes dynamically, having one or several dominant and non-constant frequencies that can exist practically anywhere in the bandwidth of the useful signal.

The above noted phase methods are based on a characteristic of the human ear of not being sensitive to phase distortions of the audio signal. In the phase methods, the phase of the incoming signal is permanently changed so as the relation in (3) become false.

Method i), as illustrated in the U.S. Pat. No. 5,307,417, dated Apr. 26, 1994, and granted to Takamura et al., is extremely complex and, consequently, makes use of a large number of instructions per second and needs a large amount of memory. Method ii), as illustrated in U.S. Pat. No. 4,449,237, dated May 15, 1984, granted to Stepp et al., and method iii) change the phase characteristic of the feedback path either randomly or deterministically, in an attempt to algebraically compensate the unwanted components of the howling spectrum. The stability margin of the closed loop is slowly increased thus the howling possibility is not completely eliminated. In addition, methods ii) and iii) introduce signal distortion. At least one drawback of method iv), see U.S. Pat. No. 5,323,458, dated Jun. 21, 1994 and granted to Park et al., is that this method assumes a spatial and electrical symmetry, which is not always true; also, the portability of this solution is restricted to only special telephone sets. A general drawback of methods i), ii), iii), and iv) is that all can handle only a limited amount of the original loop gain.

In the attenuation methods, the incoming signal is attenuated so that the relation in (2) become false.

The previous attenuation methods, as illustrated in U.S. Pat. No. 5,379,450, dated Jan. 3, 1995, granted to Hirasawa et al., depend on the signal level, and on the specific mechanical and electrical characteristics of the telephone sets as well. Also, these methods make use of absolute reference levels other than 0 volts, and are characterized by increased complexity and high computational effort. Regarding the actual full-duplex voice switches, as illustrated in the U.S. Pat. No. 5,099,472, dated Mar. 24, 1992, granted to Townsend et al., the attenuation is introduced on the two speech paths permanently, disregarding the presence or absence of howling.

The solution proposed in this patent application involves the introduction of attenuation only when howling is recognized from other signals existing on telephone networks.

SUMMARY OF THE INVENTION

Therefore, in accordance with a first aspect of the present invention there is provided a controller for use in a telephone circuit to control howling signals created by positive feedback between receive and transmit paths in the circuit. The controller comprises: detection means to detect an initiation of a howling signal in the circuit; attenuation means to introduce attenuation into one of the receive and transmit paths; and processing means to control the attenuation level as a function of the howling signal.

In accordance with a second aspect of the present invention there is provided a method of controlling a howling signal in a telephone circuit having a receive path and a transmit path, the howling signal being generating by a positive feedback between the paths. The method comprises detecting the onset of a howling signal and introducing attenuation to at least one of the paths to cancel the howling signal.

In accordance with a third aspect of the present invention there is provided an algorithm for controlling a digital signal processor (DSP) howling controller to cancel howling in a telephone circuit having a receive path and a transmit path, the algorithm comprising: detecting the onset of howling by monitoring input samples from the receive path; controllably introducing attenuation to at least one of the receive or transmit paths to thereby reduce the howling signal; and stopping the introduction of attenuation when the howling signal reaches zero.

In a preferred embodiment there is a maximum level of attenuation that can be introduced.

In a further preferred embodiment the algorithm includes prediction logic to verify that the detected signal is in fact a howling signal.

BRIEF DESCRIPTION OF THE DRAWINGS

The invention will now be described in greater detail with reference to the attached drawings wherein.

DETAILED DESCRIPTION OF THE INVENTION

Figure 1:
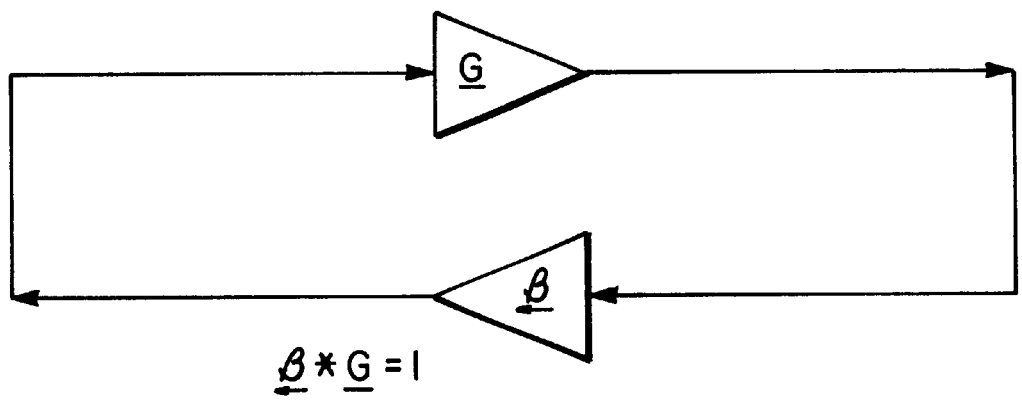
FIG. 1 shows the basic positive feedback mechanisms.
Figure 2:
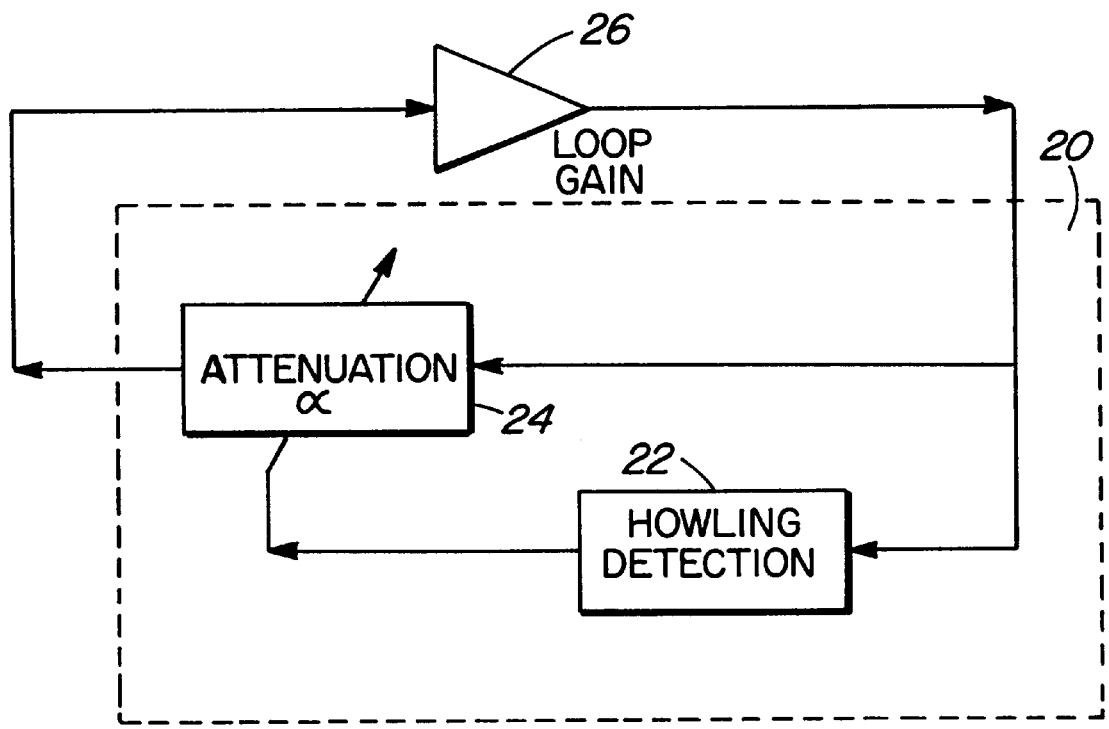
FIG. 2 illustrates the howling controller principle.

The howling controller principle is shown in block 20 of FIG. 2, in which its two main functions are represented: the howling detection function 22 and the attenuation a function 24. The first one has the ability to distinguish a howling signal from other input signals, including speech, music, and DTMF (dual-tone multi-frequency). Based on this, the attenuation function lowers the initial loop gain 26 up to that particular level where howling disappears.

Figure 3:
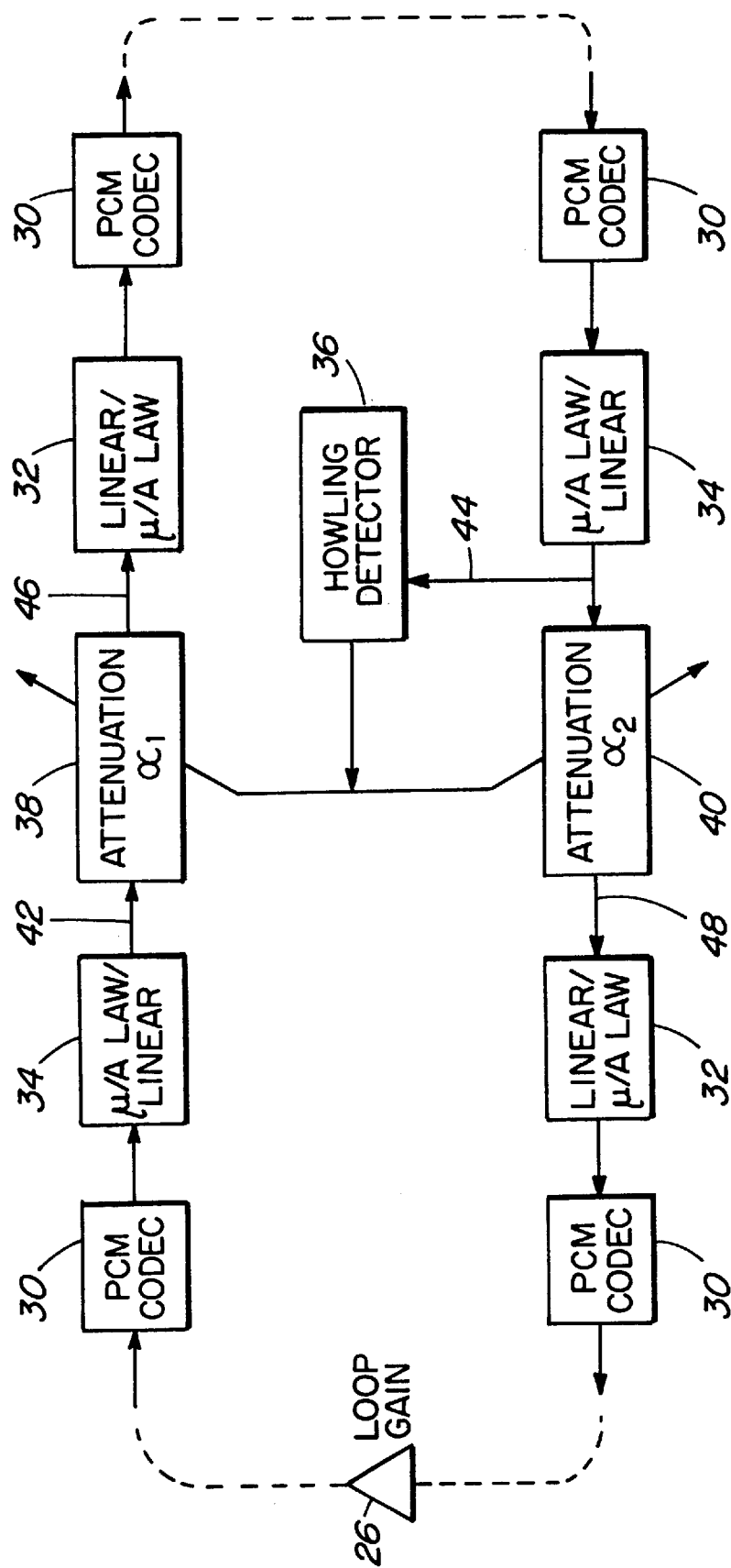
FIG. 3 shows a typical loop configuration with howling controller.

FIG. 3 shows a typical loop configuration in which are represented, for clarity, the howling controller elements. These include initial loop gain 26; PCM codes 30; linear/μ/A law 32; μ/A law/linear conversion blocks 34; howling detector 36; attenuation α1 38 and attenuation α2 40. In FIG. 3 PCM codes 30 are pulse code modulation codes, in conformity with the G.711 CCITT recommendation; μ/A law/linear blocks 34 are voltage level expanding blocks, in conformance with the G.711 CCITT recommendation; and Linear/μ/A law 32 are voltage level compression blocks, in conformance with the G.711 CCITT recommendation. Also in FIG. 3 input1 samples are taken at point 42; input2 samples are taken at point 44; output1 samples are taken at 46 and output2 samples at 48.

Figure 5:
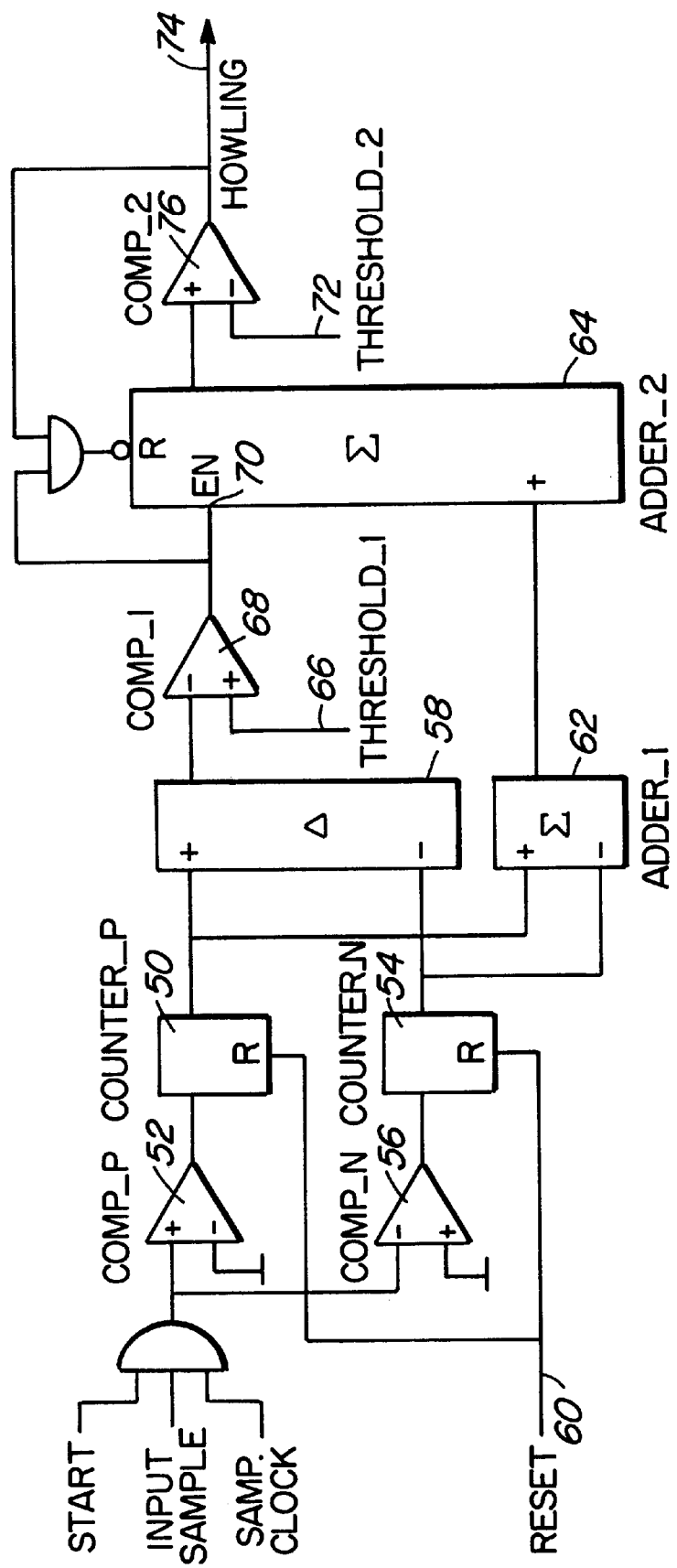
FIG. 5 is an equivalent hardware schematic of the basic howling detection algorithm.

Although the howling detection is conceived as a DSP software algorithm, in order to ease its understanding, the explanation thereof will be done in this paragraph with reference to the hardware schematic shown in FIG. 5. The sampling frequency is assumed to be 8 kHz.

Figure 7A:
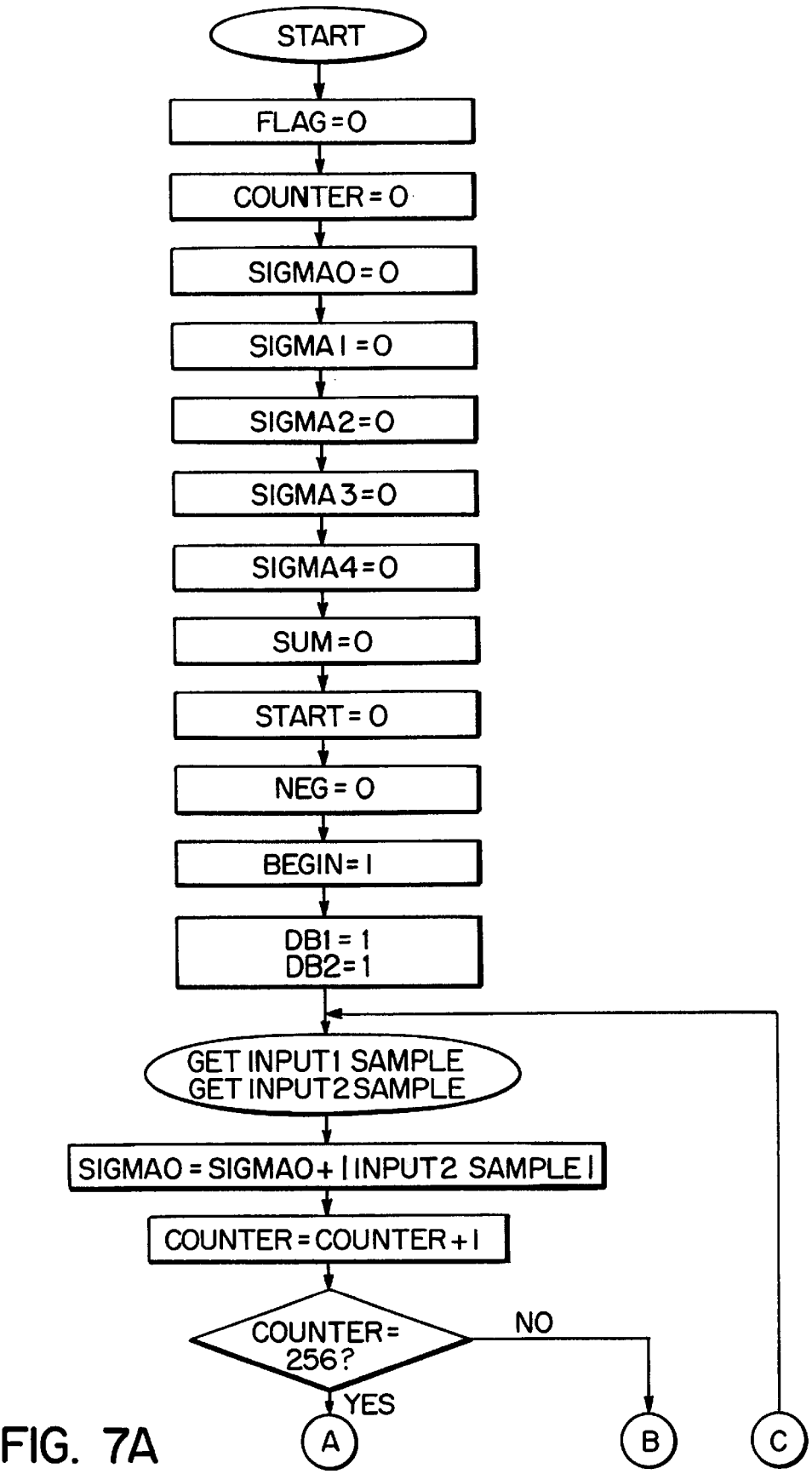
FIGS. 7A, 7B and 7C illustrate the complete algorithm flow chart of the howling controller.
Figure 7B:
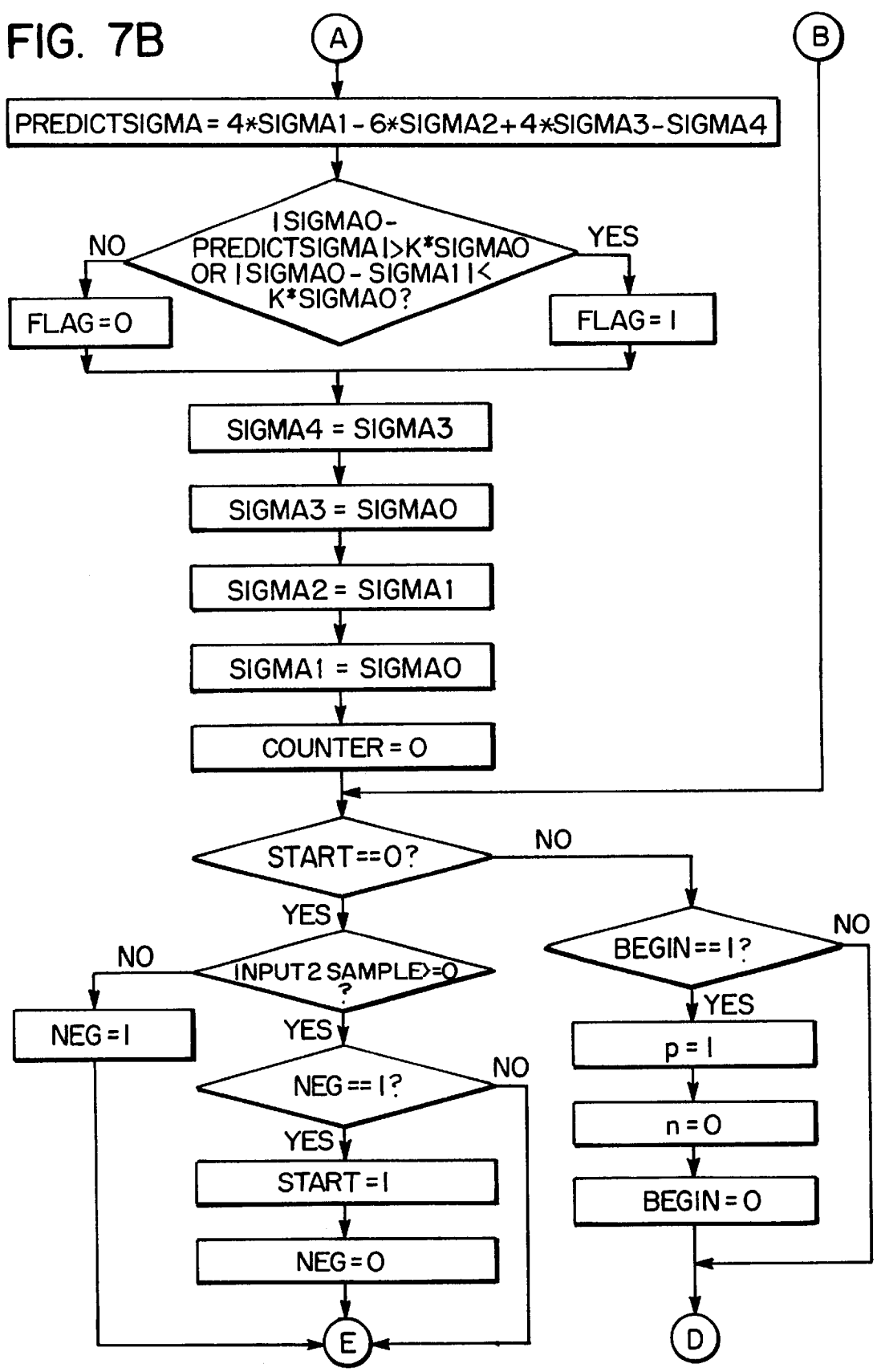
Figure 7C:
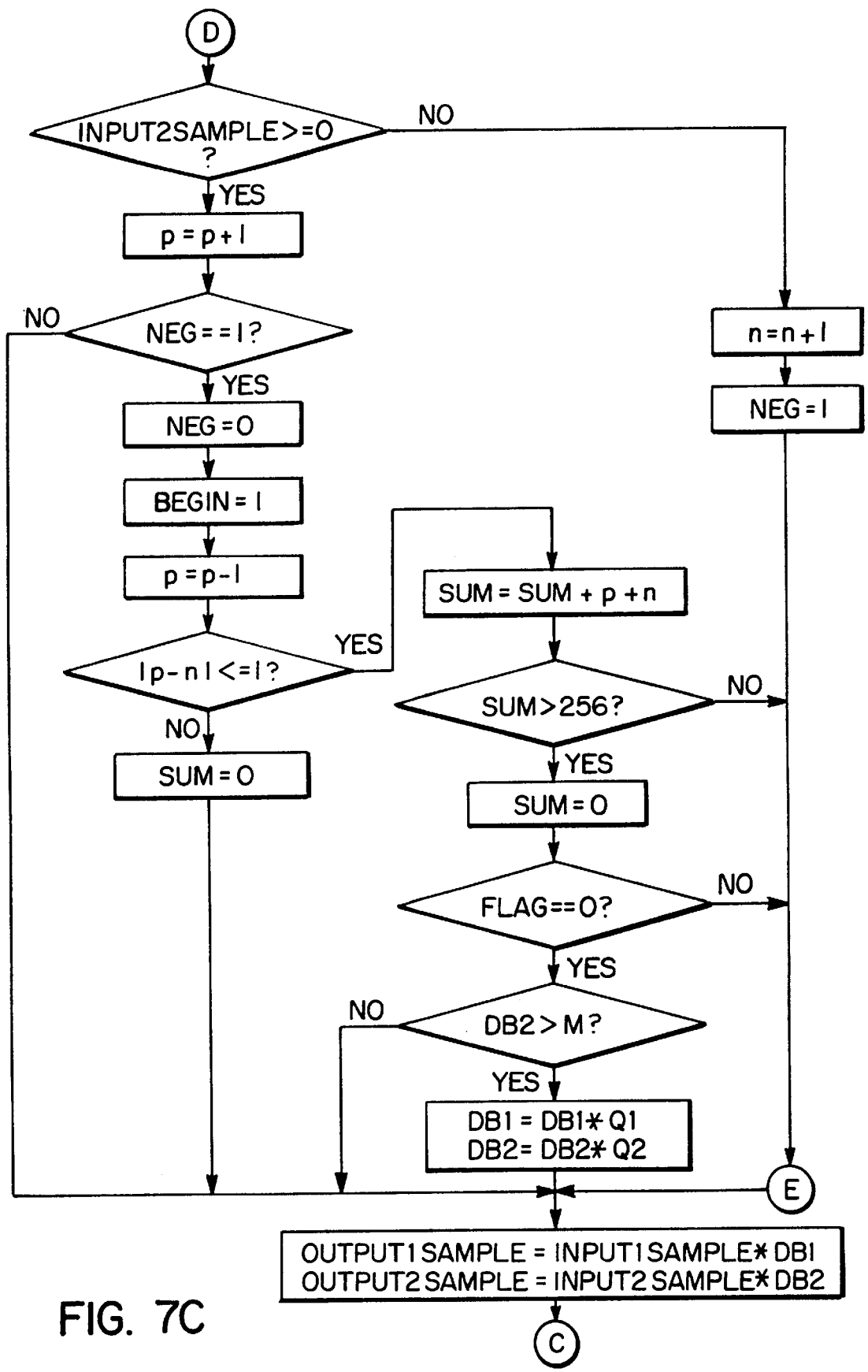

The incoming signal (INPUT SAMPLE) is analyzed continuously, sample by sample. One counter 50, (COUNTER_P), starts its operation at the first incoming positive sample furnished by the comparator 52 (COMP_P), and stops at the last contiguous positive sample. A second counter 54, (COUNTER_N), is then activated by the comparator 56 (COMP_N), to count all the incoming, contiguous negative samples. FIG. 5 does not show the equivalent hardware circuit, that finds in the incoming signal, the first found positive sample to be offered to COUNTER_P 50; in the original software, this is done by a loop that waits for negative samples. The exit from the loop is permitted at the first positive sample only. A difference between the contents of the two counters is then performed by an absolute value differentiator Δ58, followed by the counters setting to zero (RESET 60). These steps just described (i.e., counting the positive samples, counting the negative samples, performing the absolute difference, resetting to zero the two counters) are permanently repeated, forming iterations. Before the counters' setting to zero, the sum of their contents at a first adder 62 (ADDER_1) is added to a second adder 64 (ADDER_2), if the absolute values of the above-mentioned differences are contiguous by being smaller or equal than a specific threshold 66 (THRESHOLD_1). This last condition is checked through comparison comparator 68 (COMP_1), and its result drives the Enabling input 70 (EN) of ADDER_2 (64). If there is at least one difference that does not respect this condition, ADDER_2 is reset to zero. When the content of ADDER_2 is bigger than a second threshold 72 (THRESHOLD_2), the output HOWLING 74 of the comparator 76 COMP_2 signalizes the presence of howling, and ADDER_2 (64) is reset to zero. Also, if there is at least one difference that is bigger than the-first threshold, the second adder is reset to zero. THRESHOLD_1 is set to 1, and THRESHOLD_2 is set preferably to 256, corresponding to a time interval of 32 msec (the sampling frequency is 8 kHz, thus 256 samples*1/8 kHz per sample=32 msec). The correspondence between the equivalent digital circuit and the actual variables used in the flowchart of FIGS. 7A to 7C are as follows:

INPUT SAMPLE - - - input2 sample
START - - - start
COUNTER_P - - - p
COUNTER_N - - - n
ADDER_2 - - - sum
THRESHOLD_1 - - - 1
THRESHOLD_2 - - - 256

Figure 4:
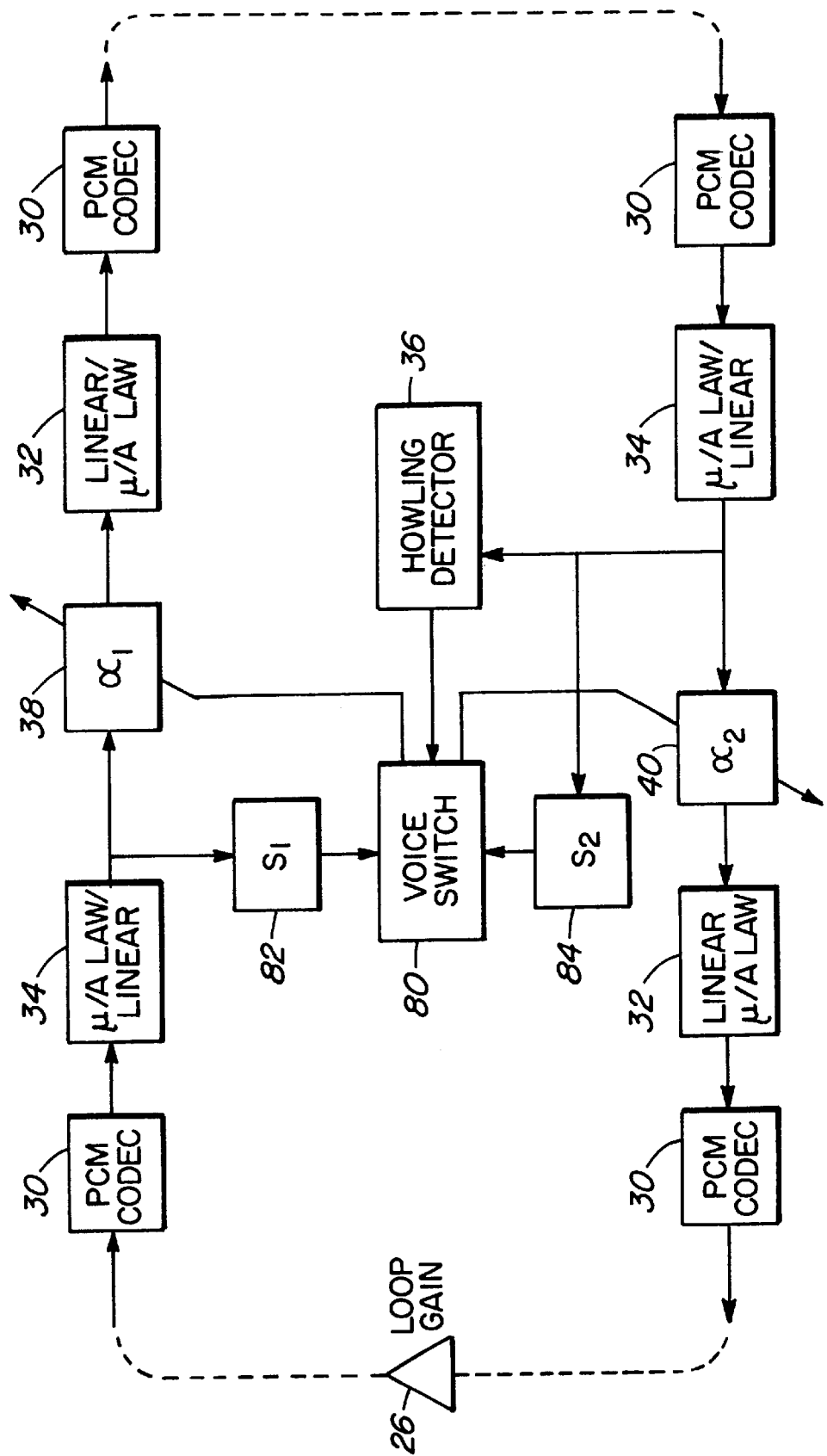
FIG. 4 illustrates a typical loop configuration with howling controller for full duplex voice switch configuration.

Every time the attenuation block receives a howling indication, the loop gain is lowered by a constant amount of decibels such that the attenuation is introduced in equal steps, preferably of about 6 dB. Consequently, the stability margin has a maximum of 6 dB. The whole amount of attenuation can be equally or unequally distributed on the two speech circuit paths (see FIG. 3); using a full-duplex attenuation switch (the switch is also known as a voice switch) could be a good approach (see FIG. 4). If the total attenuation to be introduced is equally distributed on the two speech circuit paths, then the path attenuation steps will be of 6 dB/2=3 dB. If the total attenuation has to be introduced unequally, then the path attenuation steps will be of q dB, and respectively, of (6−q)dB. The case shown in FIG. 4, in which the total attenuation is introduced using a full-duplex voice switch 80 controlled by the samples' energies $S_1$ and $S_2$ (82 and 84), is not covered in detail herein. The total amount of attenuation introduced by the howling controller may be limited to a maximum permissible attenuation value. In this case, every time a new attenuation is introduced, the total amount of attenuation introduced is compared to that maximal value. A new attenuation step is allowed only if the maximum permissible value is higher than the current total attenuation introduced by the howling controller.

This is the basic algorithm of the howling controller.

To increase the resistance of the basic algorithm to the practically very rare situations, in which signals resembling howling could be misinterpreted as howling, prediction logic is added to the basic algorithm; the basic algorithm and the prediction logic work in parallel.

Because howling carries no information, the probability of accurately predicting the next value of a howling signal sigma0 (see below) is higher than that of accurately predicting a sigma0 that characterizes an information signal.

This is the principle which relies upon the above-mentioned prediction logic.

Figure 6:
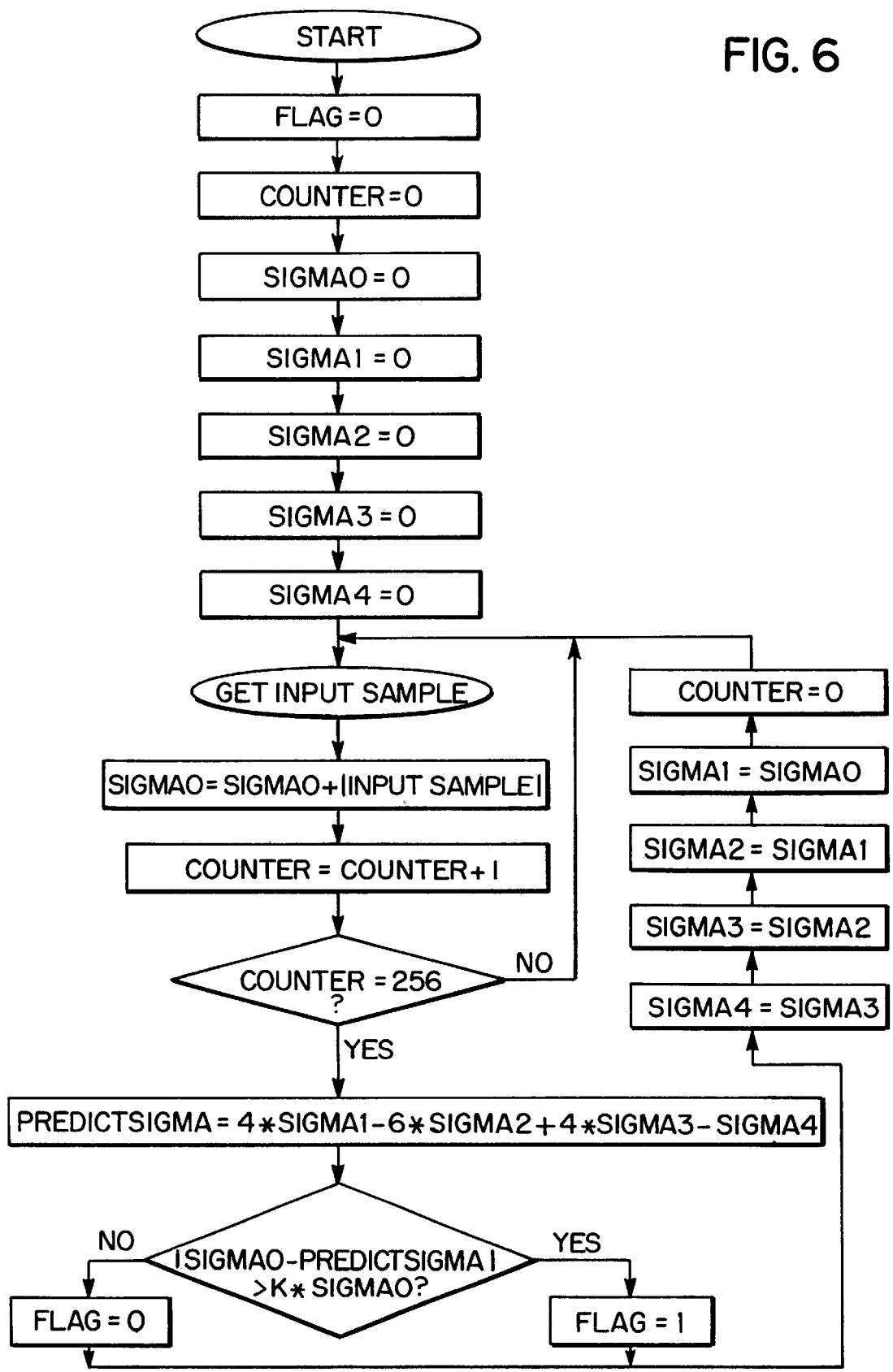
FIG. 6 is a flow chart of the prediction logic algorithm.

The flowchart of this logic is shown in FIG. 6, and is explained separately in this paragraph. The sampling frequency is assumed to be 8 kHz. After the initialization of the variables: flag, counter, sigma0, sigma1, sigma2, sigma3 and sigma 4, one sample is taken of each of the two speech circuit paths: input1 sample and input2 sample. The absolute values of the input samples are added continuously to sigma0, until the counter reaches a certain value, preferably set to 256 (equivalent to 32 msec elapsed time interval). Then the content of sigma0 is memorized in sigma1, the counter is reset to zero, and the process continues for another 32 msec. After that the contents of sigma1 is memorized in sigma2, and the new value of sigma0 is loaded into sigma1. Again the counter is reset to zero and the same routine is performed two more times. From now on, the process will make use of four memorized values of sigma4, sigma3, sigma2 and sigma1, and the current value of sigma0, to predict the next value of sigma0. Its predicted value is obtained by imposing preferably a constant third order differential over the 32 msec time interval; the mentioned preference refers to the order of the differential. The predicted value of sigma0 is given by the following formula:

$$\text{predictsigma} = 4*\text{sigma1} - 6*\text{sigma2} + 4*\text{sigma3} - \text{sigma4} \quad (4)$$

Then the absolute value of the difference between sigma0 and predictsigma is compared to a small fraction K of sigma0; the preferred value of K is 0.01. Depending on the result of the comparison, a flag is or is not raised to a logic "high". The value of this flag will logically "and" condition the signal. HOWLING from the basic algorithm (see FIG. 5). Finally, the counter is reset to zero, and the memories of sigma4, sigma3, sigma2, and sigma1 are updated by the rule:

$$\text{sigmaX} = \text{sigmaY}, \text{ where } X=Y+1, \text{ and } X=0,1,2 \text{ and } 3. \quad (5)$$

However, the final form of the prediction logic also offers information used to distinguish pure sinusoidal tones from other signals present on telephone circuits. Compared to howling, sinusoidal waves are more predictable. Hence, a sinusoidal signal should check the following inequality with a high accuracy:

$$|\text{sigma0} - \text{sigma1}| < K*\text{sigma0}, \quad (6)$$

where K has, preferably, the same value of 0.01. Accordingly, the former comparison in which predictsigma was involved becomes a double-condition comparison; these two conditions are logically "or" tied:

$$|\text{sigma0} - \text{predictsigma}| > K*\text{sigma0} \text{ or } |\text{sigma0} - \text{sigma1}| < K*\text{sigma0}. \quad (7)$$

So, if at least one of these conditions is fulfilled, the flag is raised to a logical "high"; otherwise it remains logically "low".

The following lines describe the complete howling controller algorithm; its flowchart is shown in FIGS. 7A to 7C. Not discussed here is the variant that makes use of a full-duplex attenuation switch. The sampling frequency is assumed to be 8 kHz.

The first step is the initialization of the following variables: flag, counter, sigma0, sigma1, sigma2, sigma3, and sigma4, for the prediction logic; sum, start, neg, begin, db1, and db2, for the basic algorithm. The next step is represented by the prediction logic, explained previously. Point B is the beginning of the basic algorithm. All analysis is based on samples taken from only one speech circuit path. These are the input2 samples in FIG. 3. start is a variable that records if the algorithm entered or not the iterative state. As long as the algorithm does not enter the iterative state, the input samples will not be affected, i.e. the output1 and output2 samples (see FIG. 3) will be replicas of the input samples. The iterative state begins as soon as the first positive sample of input2 is detected. A logical loop finds this first positive sample by looking for negative samples. Let us suppose that the input2 sample is positive. Because this is not a negative sample, the logical loop mentioned above will not permit the algorithm to enter the iterative state. In this case the value of the variable neg is checked. Here, the variable neg has the role of recording if at least one negative input sample was detected. Hence, because no negative sample was yet found, neg remains 0. Now, let us suppose that after several positive input samples, a negative input sample has arrived. In this case, the variable neg changes its status to 1. The next negative input samples will be followed by a positive sample of a new series of positive input samples. This time, because neg is 1, new actions are taken: start changes to 1 and neg to 0. So, neg will be reused further with a similar purpose, and the new value of start will place the algorithm in the iterative state. A similar explanation addresses the case in which the first input sample that starts the operation of the logical loop is negative. In the iterative state of the algorithm, the following steps are performed. When a second positive input sample arrives, and because the variable begin is 0, the variable p that counts the positive samples becomes 1. This 1 represents the previous positive sample that placed the algorithm in the iterative state; the actual positive sample will be taken.into consideration further. At this stage (point D on the flowchart,) the variable n, that counts the negative input samples, is still 0, and the variable begin changes its status to 0. Because the last input sample is positive, p is incremented. The variable n records if at least one negative input sample was detected during an iteration (for the meaning of iteration, see the paragraph referring to the equivalent hardware schematic, or below). Hence, because no negative sample was found yet, neg remains 0. The number of the positive input samples will be counted by the variable p. Now, let us suppose that a negative input sample arrives. Because begin was previously set to 0, there is a jump to point D in the flowchart of FIG. 7C. Then the variable n that counts the negative samples is incremented, and variable neg is assigned to 1. Up to this moment, the output1 and output2 samples are only replicas of the input1 and input2 samples. The next negative input samples will be followed by a positive sample of a new series of positive input samples. This time, because neg is 1, new actions are taken: neg becomes 0 again and begin is set to 1, to prepare for a new iteration, and the counter p is decremented, because this new positive sample belongs to a new iteration. The next step is checking the absolute value of the difference between p and n. If this absolute value is smaller than 1, then the variable sum, which is an adder, is increased with the result of the addition between p and n. Then, sum is compared to a certain threshold, preferably set to 256. If sum is not bigger than 256, then a new iteration will be processed and the output samples will not be affected. If sum is bigger than 256 sum shall be reset to zero. Then, the value of flag is checked. If flag is not equal to zero, then a new iteration will be processed and the output samples will not be affected. If flag is equal to zero, then the algorithm considers the input as howling, and, for the first time, the output samples will no longer be replicas of input samples. The variable db2, that corresponds to the level of attenuation introduced on the speech circuit path where the input2 samples appear, is compared to a third threshold, called M; this M is the maximum permissible attenuation on that particular path, and is expressed as the decimal number corresponding to a certain amount of decibels (dB). For example, if the maximum attenuation allowed on that speech circuit path is set to −12 dB, then M is 10^(−12/20)=0.25. If db2 is bigger than M, then the value of db2 is changed to db2*q2; similarly, the value of db1, that corresponds to the level of attenuation introduced on the speech circuit path where the input1 samples appear is changed to db1*q1. The sum q1+q2 corresponds to an attenuation step preferably set to 6 dB. q1 and q2 are decimal numbers corresponding to certain amounts of decibels (dB). For example, if the amount of attenuation, set up for the speech circuit path where the input2 samples appear, is −4 dB per attenuation step, then q2 is 10^(−4/20)=0.63. q1 can be calculated in the same way, considering for this example an attenuation of 6 dB−4 dB=2 dB per attenuation step. Then output1 and output2 samples are calculated. Their values are obtained by multiplying the original input1 and input2 samples with the attenuation factors db1 and db2. If db2 is smaller than M, then no additional attenuation will be introduced. In this case, the attenuation factors db1 and db2 will remain permanently constant.

In summary, a new approach to howling prevention has been developed. Its corresponding DSP howling prevention algorithm has the ability to recognize howling from other signals that travel on the telephone network subscriber loops including speech, music and DTMF signals. After detecting the howling signal, the algorithm cancels it by attenuating the original loop gain with a similar amount of decibels that, if added to a stable loop that was placed in its stability margin, would cause the loop to become unstable. In other words, the value of this attenuation depends on the gain loop only, and is minimal in the sense that the loop becomes stable in a controlled stability range. The algorithm starts attenuating when howling condition exists and ceases to attenuate when howling conditions no longer exist. The algorithm does not depend on the signals amplitudes, phases, shapes, spectra, etc. Additionally, the algorithm does not depend on the telephone set or speaker-phone mechanical and electrical characteristics. The algorithm introduces neither non-linear amplitude distortion nor phase distortions. Due to its simplicity this DSP algorithm can be implemented more easily than previous algorithms. The requirements are low, in terms of computational effort, speed and memory; few dozens of lines of high level code are sufficient to implement the algorithm.

While preferred embodiments of the invention have been described and illustrated it will be apparent to one skilled in the art that numerous alterations and variations can be made to the basic concept. It is to be understood that such alterations and variations will fall within the intended scope of the invention as defined by the appended claims.

What is claimed is:

1. A controller for use in a telephone circuit to control howling signals created by positive feedback between receive and transmits paths in said circuit, said controller comprising:

detection means to detect initiation of a howling signal in said circuit, the detection means having means to count continuously, sample by sample, contiguous positive or negative samples and to compare the absolute values of each, bowling being detected when a difference between the respective absolute values exceeds threshold values;

attenuation means to controllably introduce attenuation into both of said receive and transmit paths; and processor means to control the amount of said introduced attenuation as a function of said howling signal;

wherein said attenuation means introduces attenuation gradually as long as howling persists.

2. The controller as defined in claim 1 wherein said attenuation is introduced into said receive path and said transmit path in equal proportions.

3. A controller as defined in claim 1 wherein said detection means includes means to distinguish howling from other input signals.

4. A controller as defined in claim 3 wherein said means to distinguish howling includes prediction logic.

5. A method of controlling a howling signal in a telephone circuit having a receive path and a transmit path, said howling being generated by a positive feedback between said paths, the method comprising:

detecting the onset of a howling signal;

controllably introducing attenuation to said paths to cancel said howling signal in such a way that said attenuation is introduced gradually as long as howling persists, wherein said detecting includes the steps of counting continuously sample by sample contiguous positive or negative samples in comparing the absolute value of cach, and wherein howling is detected when a difference between the respective absolute values exceeds threshold values.

6. The method as defined in claim 5 said step of detecting onset of a howling signal includes a prediction logic step of distinguish howling from other input signals.

7. The method as defined in claim 6 wherein said prediction logic step includes the adding of absolute values of input signals continuously until the sum of absolute values of input signals reaches a predetermined value which is stored and the step is repeated wherein the predicted value of the next signal is based on the stored values.

8. The method as defined in claim 7 wherein the predicted value is obtained by imposing a third order differential over each stored interval.

9. The method as defined in claim 5 wherein said attenuation is introduced into said paths in equal proportions.

10. The method as defined in claim 5 wherein said attenuation is introduced into said paths in unequal proportions.

11. The method as defined in claim 5 wherein the step of detecting the onset of a howling signal distinguishes a howling signal from speech, music or DTMF signals.

* * * * *